Oct. 31, 1950 L. W. HUMES ET AL 2,528,277
ADJUSTABLE AXLE AND STEERING ASSEMBLY
Filed Dec. 5, 1947
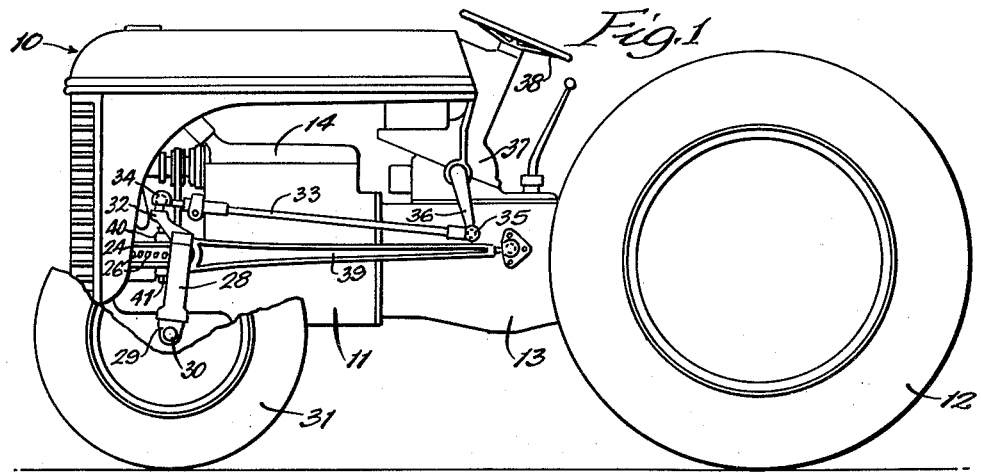
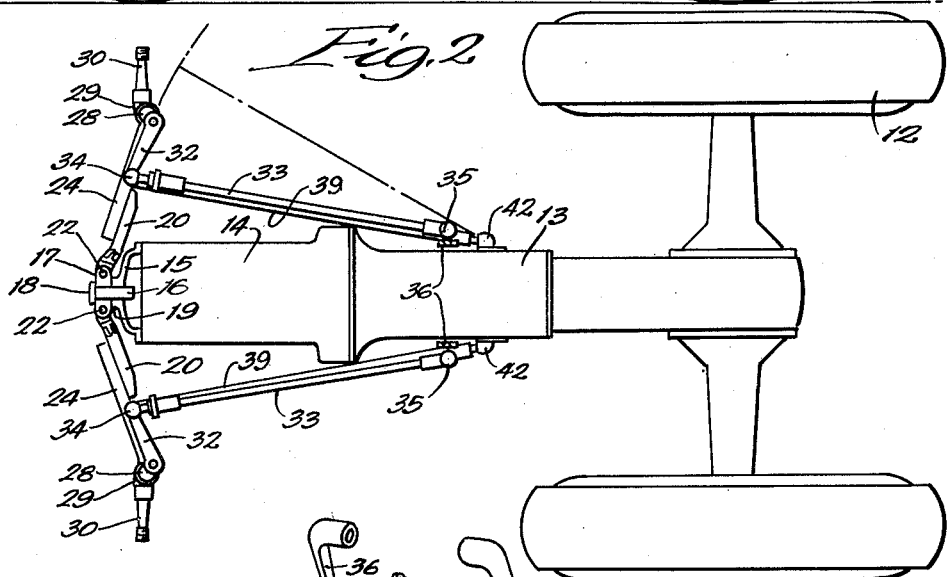
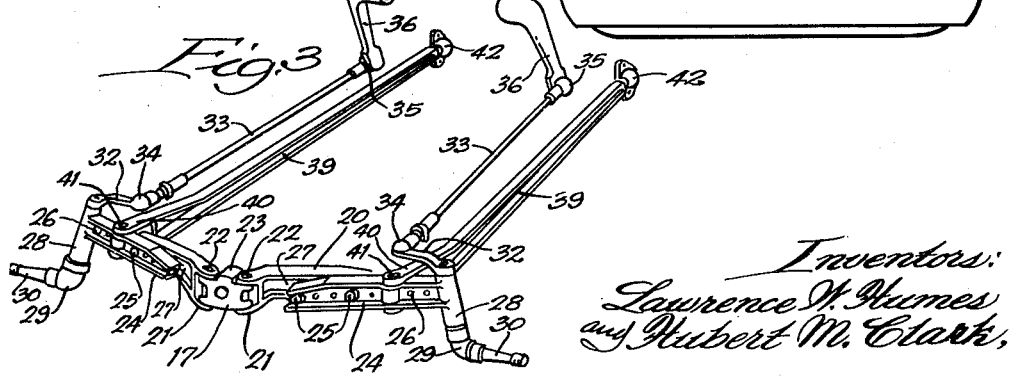
Inventors:
Lawrence W. Humes
and Hubert M. Clark,
By Dawson, Ooms, Booth and Spangenberg,
Attorneys.

Patented Oct. 31, 1950

2,528,277

UNITED STATES PATENT OFFICE 2,528,277

ADJUSTABLE AXLE AND STEERING ASSEMBLY

Lawrence W. Humes, Detroit, and Hubert M. Clark, Wayne, Mich., assignors to Sherman Industries, Inc., Royal Oak, Mich., a corporation of Michigan Application December 5, 1947, Serial No. 789,904

6 Claims. (Cl. 280—93)

This invention relates to tractors and more particularly to the construction of the tractor front axle and wheel assembly whereby the spaced relation between the wheels may be laterally adjusted without interfering with the operation of the tractor parts.

It is an object of this invention to produce a tractor in which the front wheels are laterally adjustable in the direction toward and away from each other in a simple and efficient manner which does not substantially interfere with the wheel alignment and the arrangement and operation of the tractor parts.

Another object is to produce a tractor in which extensible axles are pivotally mounted on the tractor to enable such forward and rearward axle movement during adjustment thereof as will eliminate the loose connection of the axle on the tractor heretofore employed for such purposes.

A further object is to produce an improved tractor of the type described employing radius and steering rods connected with the extensible axles and steering wheels respectively and arranged in such manner that the steering wheels are caused to turn relative to their support in response to extension adjustment.

A still further object is to produce a tractor of the type described in which the steering wheels are caused to remain substantially in alignment when they are adjusted laterally from their normal position.

These and other objects and advantages of this invention will hereafter appear, and for purposes of illustration, but not of limitation, an embodiment of the invention is shown in the accompanying drawing in which—

Figure 1 is a side elevational view of a tractor with parts broken away more adequately to disclose various internal parts;

Figure 2 is a top plan view of the tractor shown in Fig. 1 with the hood removed; and Figure 3 is a perspective detail view of the front axle construction with top detached to show the operating parts.

Referring now to the drawing, 10 indicates a tractor of conventional construction including a frame 11 supported at its rear on wheels 12 and having a transmission 13 and a driving engine 14.

A bracket 15 secured to the forward end of the frame 11 rigidly mounts a kingpin 16 which carries a supporting member in the form of a hub 17. The hub is free to turn on the kingpin but longitudinal movement relative thereto is effectively prevented by the head 18 on the pin and the sleeve-like extension 19 integral with the forward portion of the bracket.

A pair of axle sections 20, each having a yoke 21 at the inner end, are hinged on vertical pins 22 to the lateral ends of the hub member 17. A central ridge 23 may be provided on the upper wall of the hub to limit the extent of swinging movement of the axle sections 20 in the forwardly or rearwardly direction. In face to face contact with each axle section are axle extensions 24 which are laterally adjustable with respect to the corresponding axle sections. In the illustrated embodiment, the extensions 24 are secured in the adjusted position by bolt and nut means 25 insertable through registered openings 26 and 27 in the axle sections and axle extensions respectively, a plurality of such openings being provided in each. The outer ends of the axle extensions are provided with substantially vertically disposed sleeves 28 which receive wheel carrying shafts 29 formed at their lower ends with integral wheel carrying spindles 30. These spindles rotatably mount the front steering wheels 31 which may be turned with respect to the corresponding axle extensions or wheel carrying parts by means of horizontally disposed arms 32 fixed to the upper end of each shaft.

Turning movement is imparted to the wheels through steering rods 33, each steering rod being pivoted at its forward end, as at 34, to the free end of the corresponding arm 32. The rear end of each steering rod is connected through a universal joint 35 to the free end of a steering arm 36 depending from the steering mechanism 37 and manually operated from the steering wheel 38. It will be manifest that longitudinal displacement of the steering rod 33 will cause turning movement of the corresponding wheel and that the steering rods will each be concomitantly longitudinally displaced in opposite directions for causing turning movement of the wheels in the same direction.

The position of the axles and their corresponding axle extensions is guided by radius rods 39, each having a yoke 40 at its forward end pivoted on a pin 41 to the outer end portion of the respective axle extension. The inner end of each radius rod is connected through a universal joint 42 to a fixed point on the side wall of the tractor frame 11.

The universal-type connections on the inner ends of both the steering rods and radius rods enable the rods to turn thereabout in a horizontal plane in response to the lateral adjustment of the corresponding axle extension and to turn in a vertical plane when one or the other of the front wheels travels over uneven surfaces. When such vertical movement occurs, the unitary assembly of the axle section and its corresponding extension turn as a unit about the kingpin. The radius rods 39 also serve to brace the axle against bending or torsional deflection, although some slight torsional movement is permitted in the pivotal connection to compensate for the deflection of the pin 41 resulting from the raising or lowering of the radius rod 39.

A cardinal feature of this invention resides in the arrangement of parts whereby the steering wheels turn relative to the extensible axles during lateral adjustment thereof in such manner that the wheels are automatically held in alignment. For instance, outward adjustment of the axle extension causes conjoint rearward swinging movement of the entire extensible axle. This is caused by the associated radius rod—the end of the radius rod pivotally connected to the axle extension turning about the corresponding universal connection as its center. Unless otherwise provided for, the steering wheel mounted thereon will be caused to toe-out, in which position it would be unfit for use.

In order automatically to achieve the desired wheel alignment conjointly with the lateral adjustment of the steering wheel, the steering rod 33 is selected to be of shorter length than that of the corresponding radius rod. The steering rod, as shown, is in vertical and lengthwise alignment with the radius rod, the universal connection associated with the latter rod being positioned rearwardly of the universal connection for the steering rod. The longitudinal space between these universal connections corresponds approximately to the differences in the lengths of the respective rods. Although such arrangement in parallelism is preferred, other arrangements may be successfully used.

As the axle assembly is extended, the free end of the steering rod swings on a shorter radius than that of the corresponding radius, and, therefore, the longitudinal displacement thereof is greater. As a result, the arm 32 is turned clockwise causing the associated wheel to toe-in. Thus by the proper selection of dimensional ratios between the corresponding radius and steering rods, the desired amount of relative turning movement may be imparted to the steering wheels to cause them to remain in alignment during the lateral adjustment of the extensible axle. It will be evident that the steering wheels will be caused to toe-out when the space between the wheels is reduced.

It will be apparent from the above description that we have produced an improved tractor front axle which eliminates the objectionable features of mounting the front axle loosely on a kingpin enabling forward and backward movement thereon during adjustment of the spread of the wheels. The improvement is accomplished by pivotally mounting the extensible axle sections for independent swinging movement and arranging the radius and steering rods operatively associated therewith for causing the wheels to remain in alignment during such swinging movement.

While one embodiment of the invention has been shown and described in detail, it will be understood that it is illustrative only and is not intended to be a definition of the scope of the invention, reference being had for this purpose to the appended claims.

What is claimed is:

1. A tractor comprising a frame, a steering mechanism carried by said frame, a pair of extensible axles pivotally connected at their inner ends to the front of said frame enabling forward and rearward swinging movement thereof, a steering wheel mounted on the free end of each of said extensible axles for turning and rotational movement, a separate radius rod connecting each of said extensible axles with the tractor, and a separate operative connection between each of said steering wheels and said steering mechanism adapted to impart turning movement to said steering wheel relative to its support conjointly with the opposed arcuate movement of said extensible axle during lateral adjustment thereof.

2. A tractor comprising a frame, a steering mechanism carried by said frame, a pair of extensible axles pivotally connected at their inner ends to the front of said frame enabling forward and rearward swinging movement thereof, a steering wheel mounted on the free end of each of said extensible axles for turning and rotational movement, a separate radius rod connecting each of said extensible axles with the tractor, and a separate steering rod operatively connecting each of said steering wheels to said steering mechanism and adapted to impart turning movement to said steering wheel in a direction opposed to that of the arcuate movement of the extensible axle during lateral adjustment thereof.

3. A tractor comprising a frame, a steering mechanism carried by said frame, a pair of extensible axles pivotally connected at their inner ends to the front of said frame enabling forward and rearward swinging movement thereof, a steering wheel mounted on the free end of each of said extensible axles for relative turning and rotational movement, a separate radius rod connecting each of said extensible axles to said tractor, and a separate steering rod operatively connecting each of said steering wheels to said steering mechanism, the steering and radius rods being arranged such that the connection of the former with the wheel is longitudinally displaced a greater distance than the connection of the latter with the extensible axle thereby to turn the wheel in a direction opposite that of the arcuate movement of the extensible axle when the latter is adjusted.

4. A tractor as claimed in claim 3 in which the length of the steering rod is selected to be less than that of the radius rod such that their free ends, operatively connected to the steering wheel and extensible axle respectively, turn about different radii.

5. A tractor as claimed in claim 4 in which the radius rods and steering rods are in vertical and lengthwise alignment and connection of the steering rod with the steering mechanism is forwardly of the connection between the radius rod and the tractor.

6. A tractor comprising a frame, a steering mechanism carried by said frame, a hub rotatably mounted on a central portion of said frame, a pair of axle members, a pivotal connection mounting the inner end of each of said axle members to the hub for the forward and rearward swinging movement, a laterally adjustable wheel carrying extension secured in its adjusted position to each of said axle members, a steering wheel rotatably mounted on the free end of each of said extensions, a separate longitudinally shiftable steering rod operatively connected at opposite ends to each of said steering wheels and said steering mechanism respectively for imparting turning movement to said wheel in response to longitudinal shifting movement of said rod, a separate radius rod pivotally connected at one end to each of said extensions and universally connected at the other end to the tractor, said radius and steering rods being arranged whereby the ends connected to said extensions and steering wheels respectively are longitudinally displaced unequal distances in response to the arcuate movement of the wheel carrying extension during lateral adjustment thereof.

LAWRENCE W. HUMES.
HUBERT M. CLARK.

REFERENCES CITED

The following references are of record in the file of this patent:

UNITED STATES PATENTS

| Number | Name | Date |
|---|---|---|
| 2,209,804 | Ashley | July 30, 1940 |
| 2,247,725 | Ferguson | July 1, 1941 |